(12) United States Patent
Inoue et al.

(10) Patent No.: US 7,138,081 B2
(45) Date of Patent: *Nov. 21, 2006

(54) METHOD FOR FABRICATING A SEAL-INTEGRATED SEPARATOR

(75) Inventors: Masajirou Inoue, Wako (JP); Toshihiko Suenaga, Wako (JP); Nobuaki Kimura, Wako (JP); Keisuke Andou, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/000,460

(22) Filed: Nov. 30, 2001

(65) Prior Publication Data

US 2002/0117780 A1    Aug. 29, 2002

(30) Foreign Application Priority Data

Nov. 30, 2000  (JP)  ............................. 2000-365292
Nov. 7, 2001   (JP)  ............................. 2001-342434

(51) Int. Cl.
  *B29C 45/14*   (2006.01)
  *B29C 45/26*   (2006.01)

(52) U.S. Cl. ................... 264/254; 264/267; 264/271.1; 264/275

(58) Field of Classification Search ................ 264/254, 264/259, 267, 268, 271.1, 275; 429/26, 34, 429/36, 38; 427/115; 29/623.2, 623.4
See application file for complete search history.

(56) References Cited

U.S. PATENT DOCUMENTS

| | | | | |
|---|---|---|---|---|
| 3,619,458 A | * | 11/1971 | Engelhardt | ................ 264/260 |
| 5,424,144 A | * | 6/1995 | Woods, Jr. | ................ 429/35 |
| 5,942,347 A | * | 8/1999 | Koncar et al. | ................ 429/30 |
| 6,057,054 A | * | 5/2000 | Barton et al. | ................ 429/42 |
| 6,319,625 B1 | * | 11/2001 | Gemberling | ................ 429/34 |
| 6,350,538 B1 | * | 2/2002 | Wilkinson et al. | ............ 429/32 |
| 6,440,597 B1 | * | 8/2002 | Mizuno | ................ 429/34 |
| 6,602,632 B1 | * | 8/2003 | Wakahoi et al. | ............. 429/35 |
| 6,649,097 B1 | * | 11/2003 | Sasaki et al. | ............... 264/102 |
| 2002/0150810 A1 | * | 10/2002 | Mizuno | ................ 429/35 |

FOREIGN PATENT DOCUMENTS

| JP | 60-257528 | 12/1985 |
|---|---|---|
| JP | 07-186165 | 7/1995 |
| JP | 10-252896 | 9/1998 |
| JP | 11-028935 | 2/1999 |

(Continued)

*Primary Examiner*—Angela Ortiz
(74) *Attorney, Agent, or Firm*—Lahive & Cockfield, LLP; Anthony A. Laurentano, Esq.

(57) ABSTRACT

A method for fabricating a seal-integrated separator for a fuel cell is presented, with which seals can be accurately positioned and the assembling time for the fuel cells may be greatly reduced. The method comprises the steps of: providing an upper mold having a groove positioned corresponding to second and fourth seals disposed on one side of a separator body, and a lower mold having a groove positioned corresponding to first and third seals disposed on the other side of the separator body; holding the separator body between the upper mold and the lower mold; and injecting melted seal material to form the seals into each of the grooves in the upper mold and the lower mold through separate gates respectively formed in the upper and lower molds. Through this method, a seal-integrated separator having the first to fourth seals which are integrated on both sides of the separator body is fabricated.

9 Claims, 10 Drawing Sheets

FOREIGN PATENT DOCUMENTS

| | | |
|---|---|---|
| JP | 11-40592 | 2/1999 |
| JP | 11-129396 | 5/1999 |
| JP | HEI 11-129396 | 5/1999 |
| JP | HEI 11-179755 | 7/1999 |
| JP | HEI 11-309746 | 11/1999 |
| JP | HEI 11-309747 | 11/1999 |
| JP | 2000-033630 | 2/2000 |
| JP | 2000-133288 | 5/2000 |
| JP | 2001-176903 | 6/2001 |

* cited by examiner

US 7,138,081 B2

METHOD FOR FABRICATING A SEAL-INTEGRATED SEPARATOR

BACKGROUND OF THE INVENTION

1. Field of the Invention

This invention relates to a method for fabricating a seal-integrated separator comprising a separator body for a fuel cell and a seal integrally formed on the separator body.

2. Background Art

Some fuel cells comprise: a membrane electrode assembly consisting of a solid polymer electrolyte membrane sandwiched between an anode gas diffusion electrode and a cathode gas diffusion electrode; and a pair of separators holding the membrane electrode assembly therebetween.

In a fuel cell of the above type, passages for a fuel gas, e.g., hydrogen, are formed on the anode side separator surface which faces the anode gas diffusion electrode, passages for an oxidizing gas, e.g., oxygen-containing air, are formed on the cathode side separator surface which faces the cathode gas diffusion electrode, and passages for a cooling medium are formed between two separators disposed adjacent to each other.

When the fuel gas is supplied to the reaction surface of the cathode gas diffusion electrode, hydrogen is ionized and moves to the cathode gas diffusion electrode through the solid polymer electrolyte membrane. The electrons generated during this process are sent to an exterior circuit, and used as DC energy. At the cathode gas diffusion electrode provided with the oxidizing gas, water is produced through the reaction of hydrogen ions, electrons, and oxygen. The surface of the separator opposite the gas diffusion electrode is cooled by means of the cooling medium flowing between the two separators.

Since each of the fuel gas, oxidizing gas, and cooling medium must separately flow through respective passages, seal means are required to separate each of the passages.

For example, seals must be provided: around communication ports which are formed, through a fuel cell stack, to distribute the fuel gas, oxidizing gas, and cooling medium to each fuel cell unit composing the fuel cell stack; along the outer periphery of the membrane electrode assembly; around the separator surface forming cooling medium passages; and along the outer periphery of both surfaces of the separator. The seal material is preferably selected from compliant materials having the appropriate resilience, such as organic rubber.

SUMMARY OF THE INVENTION

As shown in FIG. 17, a solid polymer electrolyte membrane 2, which is larger than gas diffusion electrodes 1a and 1b each of which is of the same size, is sandwiched between the gas diffusion electrodes 1a and 1b, and the outer periphery of the membrane electrode assembly is sealed at a protruding portion 2a, protruding from gas diffusion electrodes 1a and 1b, of the solid polymer electrolyte membrane 2.

In this type of seal structure, the desired sealing performance will not be properly achieved unless two seals 3a and 3b each of which is disposed on one side of the solid polymer electrolyte membrane 2 are symmetrically located about the solid polymer electrolyte membrane 2.

As shown in FIG. 18, for example, if the two seals 3a and 3b are disposed with a lateral offset with respect to each other as shown in the figure, the area of the solid polymer electrolyte membrane 2 sandwiched between the seals 3a and 3b (hereinafter referred to as "sealed area".) is reduced; consequently, the desired sealing performance will not be properly achieved.

As shown in FIG. 19, if the two seals 3a and 3b are not disposed symmetrically about the solid polymer electrolyte membrane 2, but in parallel so that the protruding portion 2a of the solid polymer electrolyte membrane 2 has a step configuration, the seals 3a and 3b form a double seal structure at the protruding portion 2a of the solid polymer electrolyte membrane 2. As a result, the protruding portion 2a has undesirable wrinkles caused by tension in the vertical direction as shown in the figure, and the solid polymer electrolyte membrane 2 is compressed with the wrinkles.

In this case, fluid tends to leak through the wrinkles.

Tension in the protruding portion 2a may degrade the durability of the solid polymer electrolyte membrane 2, and could cause failure thereof in a short period, under repeated changes from hot to cold.

From the foregoing description, in order to prevent excessive stress in the solid polymer electrolyte membrane 2, it is critical to position the seals 3a and 3b with high accuracy when the stacking body is assembled. Specifically, the thinner the seal width is, the more accurately the seal must be positioned.

As a means to accomplish this, the assembly tolerance in the lateral direction may be increased by making the width of one seal wider than that of the other seal, as shown in FIG. 20.

In this seal structure, although a reduction in the sealed area can be prevented, compressive stress is widely distributed in the wider seal 3c, surface pressure applied by the seal 3c is relatively low, and the sealing performance of the seal 3c is degraded, which is undesirable.

When assembling a fuel cell unit or a fuel cell stack consisting of stacked fuel cells, respective seals must be disposed between an anode gas diffusion electrode and an anode side separator, between a cathode gas diffusion electrode and a cathode side separator, and between an anode side separator and a cathode side separator disposed adjacent to each other. Assembling sheet-shaped seals which are not integrated on the separators or coating a paste of the seal material onto the separators requires much time for assembling, and consequently causes an increase in cost during mass production.

Based on the above problems, an object of the present invention is to provide a method for fabricating a seal-integrated separator in which the seals are accurately positioned, and with which the assembling time for the fuel cell units is greatly reduced.

In order to achieve the above object, the method according to the present invention provides the following.

In a first aspect of the present invention, a method for fabricating a seal-integrated separator (e.g., a cathode side separator 14 in the embodiments) for a fuel cell, the seal-integrated separator including a separator body (e.g., a cathode side separator body formed by press forming) having a communication port (e.g., an oxidizing gas supply communication port 61a, an oxidizing gas exhaust communication port 61b, a fuel gas supply communication port 62a, a fuel gas exhaust communication port 62b, a cooling medium supply communication port 63a, and a cooling medium exhaust communication port 63b), and seals (e.g., a first to sixth seals 41–45), which are integrated on both sides of the separator body and which are disposed around an electrode's reaction surface (e.g., a cathode gas diffusion electrode (25) surface and an anode gas diffusion electrode (27) surface facing a solid polymer electrolyte membrane 18), during use or around the communication port, comprises the steps of: providing an upper mold (e.g., upper molds 81, 91, 110, 120, 130, 140, and 150) having a groove (e.g., a second groove 92, a fourth groove 94, and a sixth groove) positioned corresponding to the seal (e.g., a second seal 42, a fourth seal 44, and a sixth seal) disposed on one side of the separator body, and a lower mold (e.g., lower molds 82, 92, 111, 121, 131, 141, and 151) having a groove (e.g., a first groove 91, a third groove 93, and a fifth groove) positioned corresponding to the seal (e.g., a first seal 41, a third seal 43, and a fifth seal 45) disposed on the other side of the separator body; holding the separator body between the upper mold and the lower mold; and injecting melted seal material to form the seals into each of the grooves in the upper mold and the lower mold through separate gates (e.g., gates 85a and 85b) respectively formed in the upper and lower molds.

According to the above method, the seals are simultaneously integrated on both sides of the separator body; thus, the seal-integrated separator can be fabricated through a single process.

As a result, the seals can be accurately positioned and the assembling time of the fuel cell units is greatly reduced, in contrast to the cases in which seals which are not integrated on the separator are positioned relative to both sides of the separator body or a paste of the seal material is coated onto the separator.

In a second aspect of the present invention, in addition to the first aspect, the gate formed in one of the upper and lower molds communicates with the gate formed in the other of the molds via mating surfaces of the molds (e.g., mating surfaces 200) by a runner (e.g., gates 84a and 84b) branching from the gate formed in the other of the molds.

According to the method using the molds with the above structure, only a single injection is required to simultaneously form the seals on both sides of the separator body; therefore, a relatively low production cost can be achieved.

In a third aspect of the present invention, in addition to the second aspect, the step of injecting melted seal material further comprises: injecting the melted seal material into each of the grooves in the molds through a wraparound cavity (e.g., a wraparound cavity 132) formed between the periphery of the separator body and both of the upper and lower molds.

According to the above method, the injection pressure in the grooves in each of the molds may be reduced; thus, the formability of the seals can be improved.

In a fourth aspect of the present invention, in addition to the first aspect, the gate is connected to a portion of the groove, i.e., the portion not forming a sealing surface of the seal.

According to the method using the molds with the above structure, the melted seal material is supplied into the groove through the gate which is formed at a portion not forming a sealing surface of the seal; therefore, a supply mark will not be made on the sealing surface, which means that improved product quality can be achieved.

A method, in a fifth aspect of the present invention, a method for fabricating a seal-integrated separator (e.g., a cathode side separator 14) for a fuel cell, the seal-integrated separator including a separator body (e.g., a cathode side separator body formed by press forming), and dual seals (e.g., a first to fourth seals 41–44), which are integrated on both sides of the separator body and which are disposed, side by side, around an electrode's reaction surface (e.g., a cathode gas diffusion electrode (25) surface and an anode gas diffusion electrode (27) surface facing a solid polymer electrolyte membrane 18), during use, comprises the steps of: providing an upper mold (e.g., upper molds 81, 91, 110, 120, 130, 140, and 150) having grooves (e.g., a second groove 92 and a fourth groove 94) positioned corresponding to the dual seals (e.g., a second seal 42 and a fourth seal 44) disposed on one side of the separator body, and a lower mold (e.g., lower molds 82, 92, 111, 121, 131, 141, and 151) having grooves (e.g., a first groove 91 and a third groove 43) positioned corresponding to the dual seals (e.g., a first seal 41 and a third seal 43) disposed on the other side of the separator body; holding the separator body between the upper mold and the lower mold; and injecting melted seal material to form the seals into each of the grooves in the upper mold and the lower mold through gates respectively formed in the upper and lower molds.

According to the above method, the dual seal-integrated separator, in which the dual seals surrounding the electrode's reaction surface function independently of each other and a fluid leak is preferably prevented around the electrode's reaction surface, can be easily fabricated through a single process.

The dual seal-integrated separator can be easily fabricated through the method using the molds with the above structure, even though it is generally difficult to fabricate a separator with dual seals since the dual seals must be accurately positioned.

In a sixth aspect of the present invention, in addition to the fifth aspect, the gate formed in one of the upper and lower molds communicates with the gate formed in the other of the molds via mating surfaces of the molds by a runner branching from the gate formed in the other of the molds.

According to the method using the molds with the above structure, the number of gates may be reduced and the seal material can be supplied under the same conditions with respect to each of the molds; therefore, a relatively low production cost can be achieved.

In a seventh aspect of the present invention, in addition to the fifth aspect, both of the upper and lower molds have a connecting cavity (e.g., connecting cavities 95 and 96) for forming a seal bridge (e.g., seal bridges 101 and 102) connecting the dual seals to each other.

According to the method using the molds with the above structure, each of the seals connected to each other by means of the seal bridge more firmly adheres to the separator body; therefore, separation of the seals from the separator body, which could occur when the seal-integrated separator is removed from the molds, can be preferably prevented. In addition, since a portion of the injected seal material is supplied into the connecting cavity for forming the seal bridge, the tolerance required for the excessively supplied melted seal material may be moderated. Furthermore, a short circuit such as due to condensation of water can be preferably prevented since the seal bridge also functions as an insulation layer.

In an eighth aspect of the present invention, in addition to the fifth aspect, the groove has a backup cavity (e.g., backup cavities 97 and 98) for accommodating an excessively injected amount of the seal material.

According to the method using the molds with the above structure, since a portion of the injected seal material is supplied into the backup cavity, the tolerance required for the excessively supplied melted seal material may be moderated.

In a ninth aspect of the present invention, in addition to the seventh aspect, the gate formed in one of the upper and lower molds communicates with the gate formed in the other of the molds via mating surfaces of the molds by a runner branching from the gate formed in the other of the molds.

According to the method using the molds with the above structure, only a single injection is required to simultaneously form the seals on both sides of the separator body; therefore, a relatively low production cost can be achieved.

In a tenth aspect of the present invention, in addition to the seventh aspect, the step of injecting melted seal material further comprises: injecting the melted seal material into each of the grooves in the molds through a wraparound cavity formed between the periphery of the separator body and both of the upper and lower molds.

According to the above method, the injection pressure in the grooves in each of the molds may be reduced; thus, the formability of the seals can be improved.

In an eleventh aspect of the present invention, in addition to the tenth aspect, the gate formed in one of the upper and lower molds communicates with the gate formed in the other of the molds via mating surfaces of the molds by a runner branching from the gate formed in the other of the molds.

According to the method using the molds with the above structure, only a single injection is required to simultaneously form the seals on both sides of the separator body; therefore, a relatively low production cost can be achieved.

In a twelfth aspect of the present invention, in addition to the fifth aspect, both of the upper and lower molds have a connecting cavity for forming a seal bridge connecting the dual seals to each other, and wherein a sprue (e.g., sprues 83a and 83b) is formed, which communicates with the grooves in each of the upper and lower mold from one of the molds via mating surfaces of the molds.

According to the method using the molds with the above structure, the melted seal material is supplied from the sprue formed in one mold into the grooves via mating surfaces of the molds; therefore, an undesired supply mark will not be made on the sealing surface, which means that improved product quality is achieved.

In a thirteenth aspect of the present invention, in addition to the twelfth aspect, another sprue is formed in the other of the molds, wherein gates communicating with the sprues in the molds are formed and connected to portions of the grooves, i.e., the portions not forming a sealing surface of the dual seals.

According to the method using the molds with the above structure, the melted seal material is supplied into the grooves from the gates which are formed at a portion not forming a sealing surface of the seal, via the sprues in each of the molds and the gates; therefore, a supply mark will not be made on the sealing surface, which means that improved product quality is achieved. In addition, the formability of the seals may be improved by means of supplying the melted seal material not only via the mating surfaces of the molds, but also via the sprue corresponding to the grooves.

DETAILED DESCRIPTION OF THE PREFERRED EMBODIMENTS

The preferred embodiments of the present invention will be explained with reference to the accompanying drawings.

Figure 1:
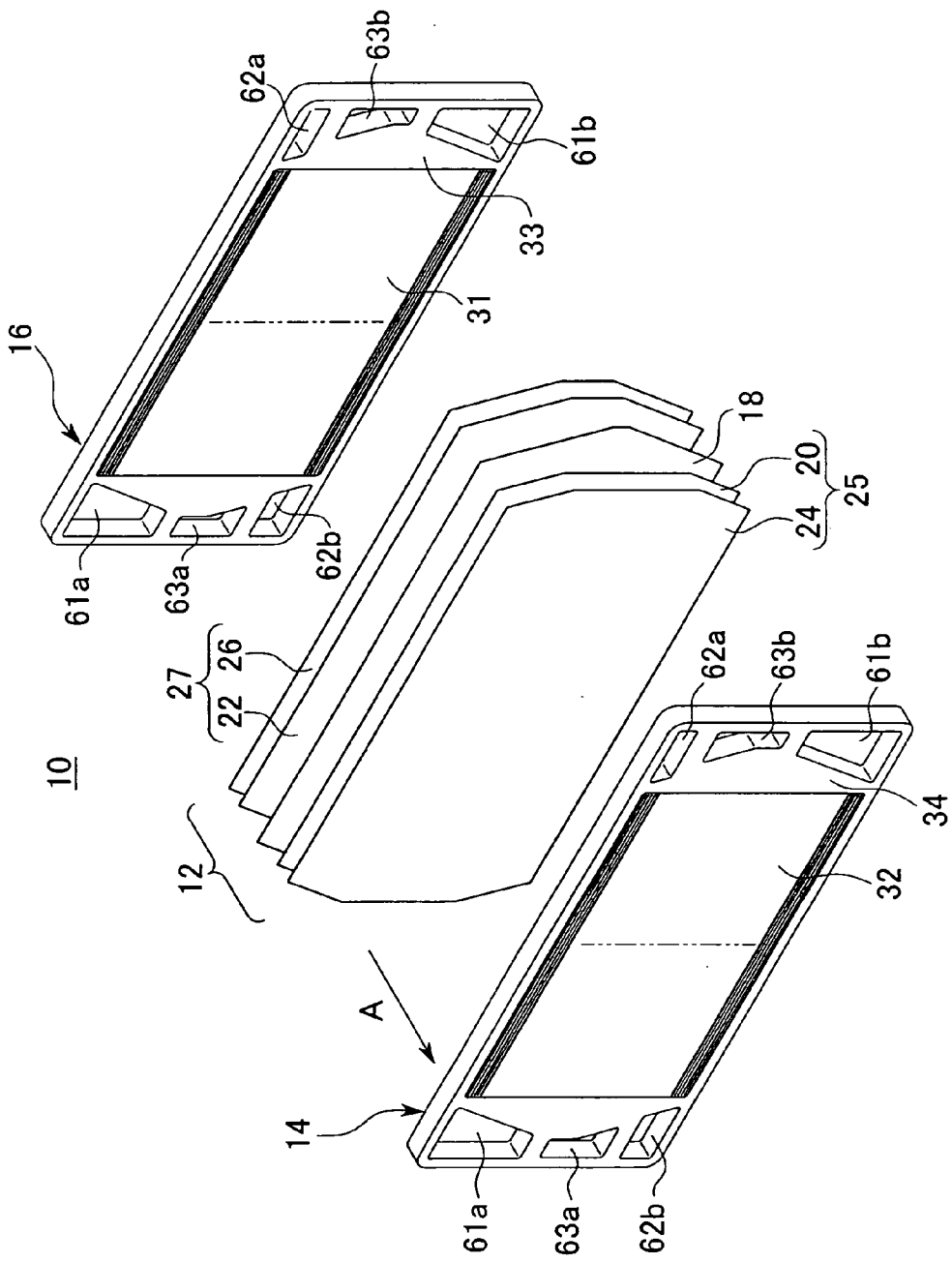
FIG. 1 is an exploded perspective view of a fuel cell comprising seal-integrated separators fabricated through a method according to the present invention.
Figure 2:
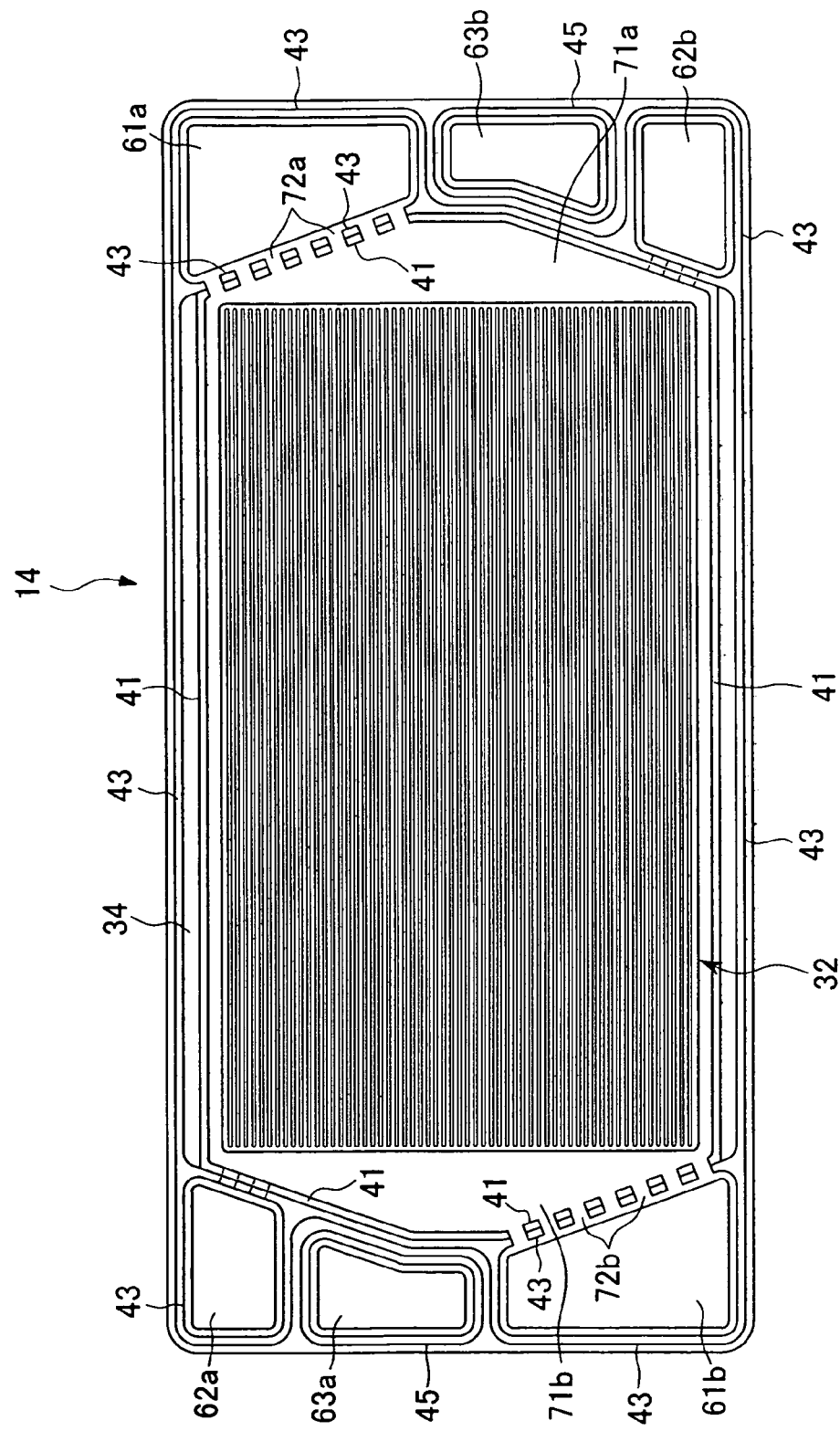
FIG. 2 is an overhead view from the direction indicated by the arrow in FIG. 1.

FIG. 1 is an exploded perspective view of a fuel cell comprising seal-integrated separators fabricated through a method according to the present invention, and FIG. 2 is an overhead view of one of the seal-integrated separators (a cathode side separator 14) shown in FIG. 1 viewed from the direction indicated by the arrow A.

Seals are not shown in FIG. 1.

A fuel cell unit 10 comprises a membrane electrode assembly 12 which is held between the cathode side separator 14 and an anode side separator 16.

A fuel cell stack for vehicles is fabricated by laminating and integrating several sets of the fuel cell unit 10 by means of fastening elements such as bolts and nuts.

The membrane electrode assembly 12 comprises: a solid polymer electrolyte membrane 18 made of, for example, perfluorosulphonate polymer; a cathode 20 and an anode 22 disposed so as to sandwich the solid polymer electrolyte membrane 18; a cathode side gas diffusion layer 24 disposed at the opposite side of the cathode 20 with respect to the solid polymer electrolyte membrane 18; and an anode side gas diffusion layer 26 disposed at the opposite side of the anode 22 with respect to the solid polymer electrolyte membrane 18.

The cathode 20 and the anode 22 are made mainly of platinum. The cathode side gas diffusion layer 24 and the anode side gas diffusion layer 26 are made of, for example, porous carbon cloth or porous carbon paper. The cathode 20 and the cathode side gas diffusion layer 24 together form a cathode gas diffusion electrode 25, and the anode 22 and the anode side gas diffusion layer 26 together form an anode gas diffusion electrode 27.

The surface of the cathode gas diffusion electrode 25 facing the solid polymer electrolyte membrane 18 and the surface of the anode gas diffusion electrode 27 facing the solid polymer electrolyte membrane 18 each function as a reaction surface.

Figure 3:
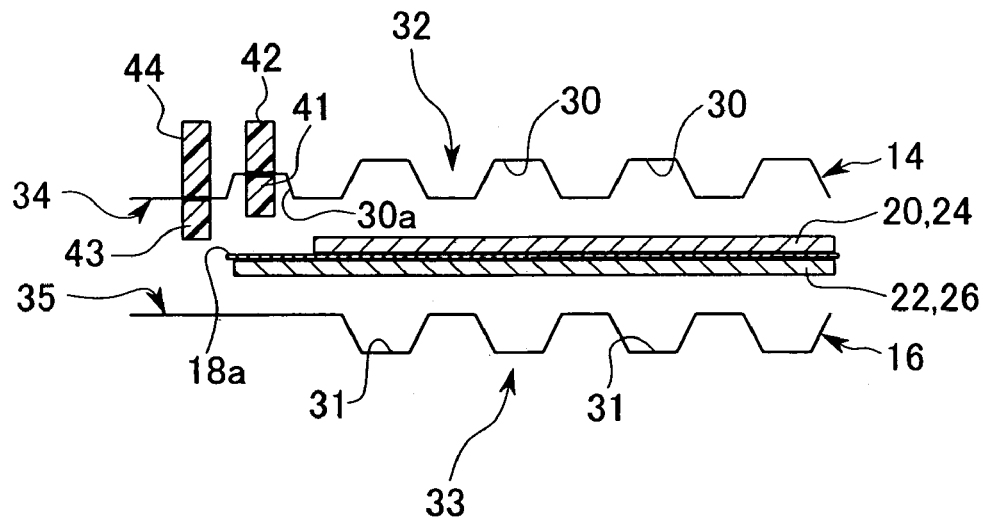
FIG. 3 is a partial cross-section schematically showing the major portion of the fuel cell shown in FIG. 1.
Figure 4:
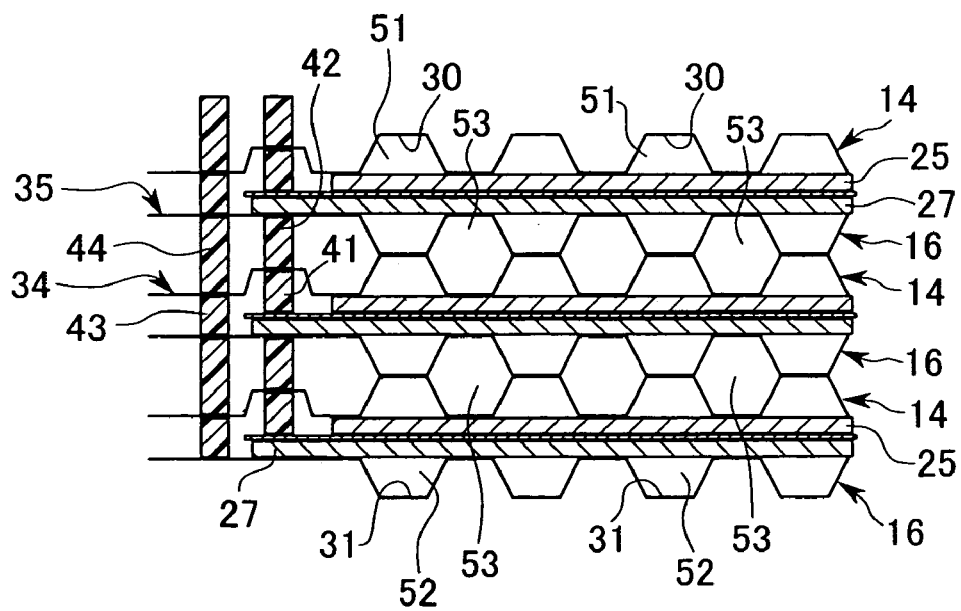
FIG. 4 is a partial cross-section schematically showing the major portion of a fuel cell stack comprising three of the fuel cells shown in FIG. 1.

FIG. 3 is a partial transverse cross-section of the fuel cell unit 10, and FIG. 4 is a partial transverse cross-section of a fuel cell stack comprising three of the fuel cell units 10 shown in FIG. 3.

As shown in FIG. 3, the solid polymer electrolyte membrane 18 has a protruding portion 18a slightly protruding from the periphery of a set of the cathode 20 and the cathode side gas diffusion layer 24 and the periphery of a set of the anode 22 and the anode side gas diffusion layer 26, these sets being disposed so as to sandwich the solid polymer electrolyte membrane 18 therebetween.

The surface area of the set of the anode 22 and the anode side gas diffusion layer 26 is smaller than that of the solid polymer electrolyte membrane 18, and the surface area of the set of the cathode 20 and the cathode side gas diffusion layer 24 is smaller than that of the set of the anode 22 and the anode side gas diffusion layer 26.

The cathode side separator 14 and the anode side separator 16, disposed so as to face the cathode gas diffusion electrode 25 and the anode gas diffusion electrode 27, respectively, are made of stainless steel plates from 0.2 to 0.5 mm thick which are stamped so as to comprise corrugated portions 32 and 33 in which a number of grooves having the same depth are disposed at a constant pitch, and plane portions 34 and 35 which are located outside the corrugated portions 32 and 33, respectively, and which contact each other via a seal 44.

This stamped plate is hereinafter referred to as "separator body".

In the cathode side separator 14 as a seal-integrated separator, a first seal 41 and a second seal 42 are integrated on the separator body at corresponding positions on both surfaces of a groove 30a (hereinafter referred to as "outermost groove 30a".) located at the outermost position of the corrugated portion 32 of the separator body, and a third seal 43 and a fourth seal 44 are integrated on the separator body at corresponding positions on both surfaces of the plane portion 34.

An integral fabrication method for the first to fourth seals 41–44, as well as fifth and sixth seals to be discussed below, will later be explained in detail.

In a single fuel cell unit 10, the first seal 41 is interposed between the front surface (reaction surface side) of the outermost groove 30a in the cathode side separator 14 and the protruding portion 18a of the solid polymer electrolyte membrane 18; the third seal 43 is interposed between the front surface (reaction surface side) of the plane portion 34 of the cathode side separator 14 and the front surface (reaction surface side) of the plane portion 35 of the anode side separator 16.

As shown in FIG. 4, in the adjacent fuel cell unit 10, the second seal 42 is interposed between the back surface (back side of the reaction surface) of the outermost groove 30a in the cathode side separator 14 and the back surface (back side of the reaction surface) of the plane portion 35 of the anode side separator 16; and the fourth seal 44 is interposed between the back surface (back side of the reaction surface) of the plane portion 34 of the cathode side separator 14 and the back surface (back side of the reaction surface) of the plane portion 35 of the anode side separator 16.

The back surface of the grooves 30 in the cathode side separator 14 of one fuel cell unit 10 and the surface of the grooves 31 in the anode side separator 16 of another fuel cell unit 10 face each other, as shown in FIG. 4; thus, spaces having trapezoidal cross-sections are formed between the grooves 30 in the corrugated portion 32 of the cathode side separator 14 and the cathode gas diffusion electrode 25, which are to be used as passages 51 for the oxidizing gas such as an oxygen-containing gas or air.

At the same time, spaces having trapezoidal cross-sections are formed between the grooves 31 in the corrugated portion 33 of the anode side separator 16 and the anode gas diffusion electrode 27, which are to be used as passages 52 for the fuel gas such as a hydrogen-containing gas.

In addition, spaces having hexagonal cross-sections are formed between the grooves 30 in the corrugated portion 32 of the cathode side separator 14 and the grooves 31 in the corrugated portion 33 of the anode side separator 16, which are to be used as passages 53 for the cooling medium such as pure water, ethylene glycol, or oil.

As a matter of convenience for the description, hereinafter, the lateral direction in FIG. 2 is referred to as the horizontal direction, and the up-and-down direction in FIG. 2 is referred to as the vertical direction.

As shown in FIG. 2, in the cathode side separator 14 and within the substantial plane thereof, there are provided: an oxidizing gas supply communication port 61a which allows the oxidizing gas to flow in the upper-right area; a fuel gas supply communication port 62a which allows the fuel gas to flow in the upper-left area; a cooling medium supply communication port 63a which allows the cooling medium to flow in the middle-left area; and a cooling medium exhaust communication port 63b which allows the cooling medium after usage to flow in the middle-right area.

Furthermore, in the cathode side separator 14 and within the substantial plane thereof, there are provided: an oxidizing gas exhaust communication port 61b which allows the oxidizing gas to flow in the lower-left area; and a fuel gas exhaust communication port 62b which allows the fuel gas to flow in the lower-right area, which are located diagonally with respect to the oxidizing gas supply communication port 61a and the fuel gas supply communication port 62a, respectively.

On the surface of the cathode side separator 14, the first seal 41 is formed so as to surround the corrugated portion 32.

The first seal 41 is located so that spaces are formed outside both the right end and the left end, in the horizontal direction of the corrugated portion 32. These spaces respectively function as an oxidizing gas inlet 71a for introducing the oxidizing gas from the oxidizing gas supply communication port 61a into each of the passages 51 for the oxidizing gas, and an oxidizing gas outlet 71b for discharging the oxidizing gas from each of the passages 51 for the oxidizing gas to the oxidizing gas exhaust communication port 61b.

The third seal 43 is formed so as to surround: the first seal 41; the oxidizing gas supply communication port 61a; the fuel gas supply communication port 62a; the oxidizing gas exhaust communication port 61b; and the fuel gas exhaust communication port 62b.

Reference symbol 45 indicates fifth seals which are disposed so as to surround the cooling medium supply communication port 63a and the cooling medium exhaust communication port 63b.

The first seal 41 and the third seal 43 respectively located between the oxidizing gas supply communication port 61a and the oxidizing gas inlet 71a, and between the oxidizing gas exhaust communication port 61b and the oxidizing gas outlet 71b, are discontinuously formed so as to create communication passages 72a to allow communication between the communication port 61a and the inlet 71a through a plurality of passages, and communication passages 72b to allow communication between the communication port 61b and the outlet 71b through a plurality of passages.

On the back surface of the cathode side separator 14, the second seal 42, the fourth seal 44, and the sixth seal, not shown, are respectively formed at symmetrical positions about the separator body with respect to the first seal 41, the third seal 43, and the fifth seal 45 formed on the front surface.

Thus, the first to fourth seals 41–44 surround the reaction surface in a dual manner, and constitute a dual seal structure for the cathode side separator 14, which can preferably prevent loss of the sealing performance.

The anode side separator 16 also has communication ports 61a, 62a, 63a, 61b, 62b, and 63b located at respective positions corresponding to the oxidizing gas supply communication port 61a, the fuel gas supply communication port 62a, the cooling medium supply communication port 63a, the oxidizing gas exhaust communication port 61b, the fuel gas exhaust communication port 62b, and the cooling medium exhaust communication port 63b, formed in the cathode side separator 14.

In this embodiment, the first to sixth seals 41–45 are not formed on the anode side separator 16.

The present invention is not limited to this embodiment, and it is acceptable if only the fifth and sixth seals 45 are formed on the anode side separator 16.

Alternatively, if the relationship in size between the cathode gas diffusion electrode 25 and the anode gas diffusion electrode 27 is opposite that in the above embodiment, the first to sixth seals 41–45 may be formed on the anode side separator 16.

Figure 5:
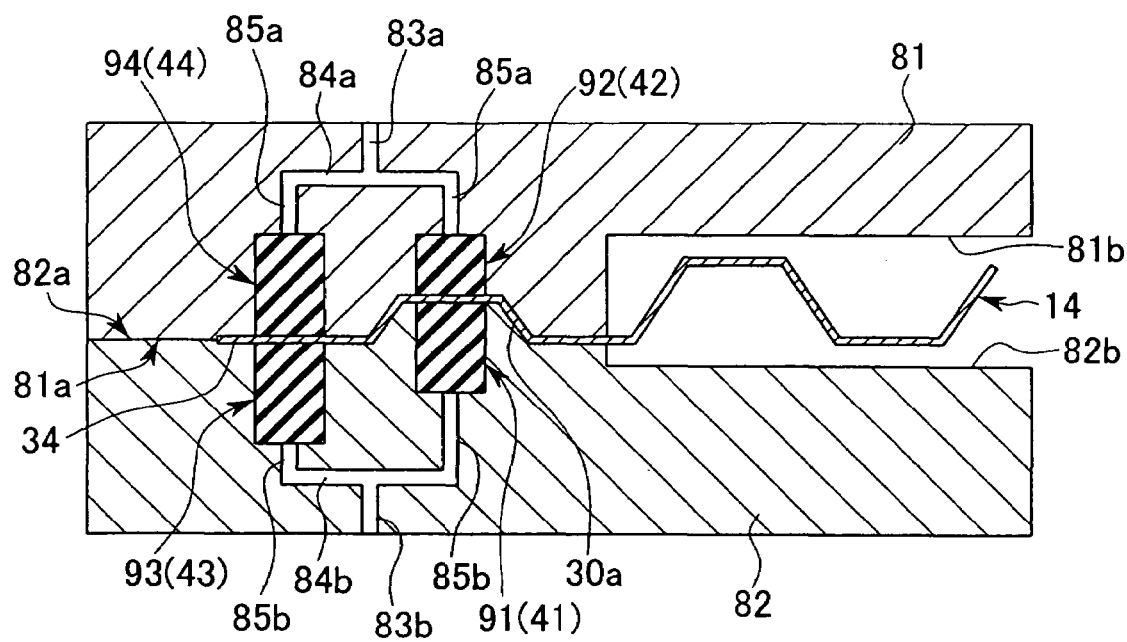
FIG. 5 is a partial cross-section of a first configuration of a metallic mold used in a first embodiment of the present invention.

Referring now to FIG. 5, a first configuration of the injection mold used for fabricating the cathode side separator 14 in the above embodiment will be explained.

Outer periphery portions 81a and 82a in the cavity-defining surfaces of an upper mold 81 and a lower mold 82 are formed with corrugations so as to be able to firmly hold the plane portion 34 and the outermost groove 30a of the separator body, and are provided with first to fourth grooves 91–94 at positions corresponding to the first to fourth seals 41–44 which are to be formed on both sides of the separator body, as well as fifth and sixth grooves (not shown) at positions corresponding to the fifth and sixth seals 45.

In contrast, the central portions in the cavity-defining surfaces of the upper mold 81 and the lower mold 82 are provided with concave portions 81b and 82b so as to accommodate the corrugated portion 32 of the separator body with predetermined clearances with respect to both sides thereof when the cathode side separator 14 is held at the plane portion 34 and the outermost groove 30a by the outer periphery portion 81a of the upper mold 81 and the outer periphery portion 82a of the lower mold 82.

Furthermore, the upper mold 81 and the lower mold 82 are provided with sprues 83a and 83b, runners 84a and 84b, and gates 85a and 85b in order to allow the melted seal material supplied from the outside to flow into the first to sixth grooves 91–94.

A method for fabricating the cathode side separator 14 using the metallic molds shown in FIG. 5 will be explained below. In the following description, only the process to integrate the first to sixth seals 41–45 to the separator body formed by press forming, which is the main feature of the present invention, will be explained.

First, the plane portion 34 and the outermost groove 30a of the separator body are placed on the outer periphery portion 82a in the cavity defining surface of the lower mold 82; then, the upper mold 81 and the lower mold 82 are closed together.

Through this process, the separator body is held by the upper mold 81 and the lower mold 82, and molding cavities are formed in both sides of the plane portion 34 and in both sides of the outermost groove 30a of the separator body.

Then, the melted seal material is injected into the sprues 83a and 83b of the upper mold 81 and the lower mold 82, and is supplied into the first to sixth grooves 91–94 through the runners 84a and 84b, and the gates 85a and 85b.

Injection molding is performed under the following conditions:

injection pressure (kg/cm$^2$): 80–120;
mold temperature (° C.): 200;
forming time (min.): 3;
mold closing pressure (tons): 35; and
seal material: silicone rubber with a hardness of 50°.

Upon completion of forming, the molds are opened to obtain the cathode side separator 14 of seal-integrated type having the first to sixth seals 41–45 integrated on both sides of the plane portion 34 and to both sides of the outermost groove 30a of the separator body.

In accordance with this fabrication method, the first to sixth seals 41–45 are simultaneously integrated on both sides of the separator body; therefore, the seals 41–45 are precisely positioned at symmetrical positions about the separator body, and the sealing performance can be improved.

In addition, the cathode side separator 14 of seal-integrated type may be fabricated through a single process; thus, the assembling time of the fuel cell unit 10 as well as the assembling time of a fuel cell stack to be formed by laminating a plurality of fuel cells unit 10 can be greatly reduced; consequently, an increase in production cost is preferably avoided.

Furthermore, in the case of forming a fuel cell stack, seals are not required for the anode side separators 16, and only one kind of metallic mold for injection is required in order to fabricate the cathode side separators 14 since the disposition of the seals on the cathode side separators 14 are unified; therefore, a relatively low production cost may be achieved.

Figure 6:
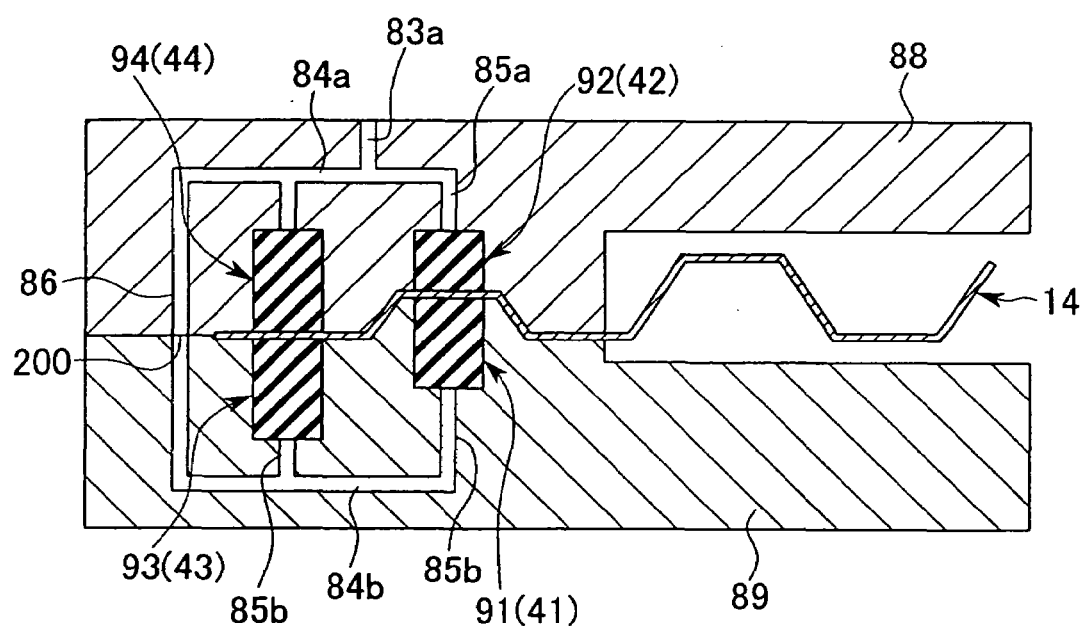
FIG. 6 is a partial cross-section of a second configuration of the metallic mold used in the first embodiment of the present invention.

Referring now to FIG. 6 and primarily comparing the difference from FIG. 5, a second configuration of the injection mold used for fabricating the cathode side separator 14 will be explained.

In FIG. 6, the same reference symbols are used for the same elements as in FIG. 5.

In the metallic mold shown in FIG. 6, a bypass portion 86, which connects the runner 84a in an upper mold 88 with the runner 84b in a lower mold 89, is provided, instead of providing the sprue 83b.

In this configuration, the melted seal material is supplied to the sprue 83a in the upper mold 88; a portion of the melted seal material is injected into the second, fourth, and sixth grooves 92 and 94 through the runner 84a and the gate 85a in the upper mold 88; the rest of the melted seal material flows from the runner 84a in the upper mold 88 to the bypass portion 86, and is injected into the first, third, and fifth grooves 91 and 93 via a mold mating surface 200 and through the runner 84b and the gate 85b in the lower mold 89.

Therefore, for the case in which the molds according to the above second configuration are used, the first to sixth seals 41–45 are simultaneously integrated on both sides of the separator body, as well.

The injection molding cost can be reduced since only a single injection into the upper mold 88 is required; although, the injection pressure should be set higher than in the first configuration.

Figure 7:
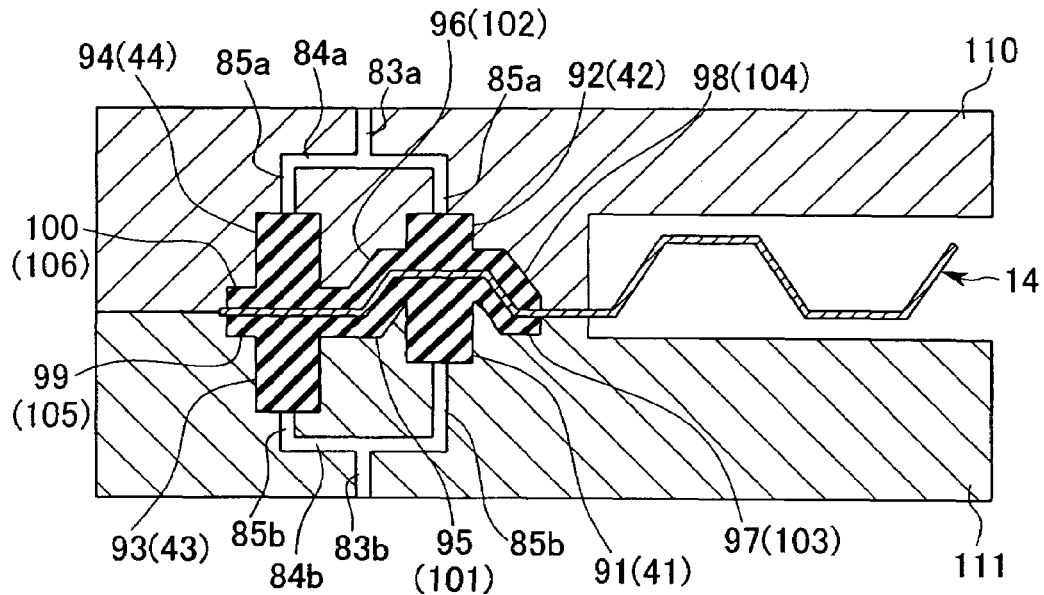
FIG. 7 is a partial cross-section of a third configuration of the metallic mold used in the first embodiment of the present invention.

Referring now to FIG. 7 and primarily comparing the difference from FIG. 5, a third configuration of the injection mold used for fabricating the cathode side separator 14 will be explained.

In FIG. 7, the same reference symbols are used for the same elements as in FIG. 5.

In these metallic molds shown in FIG. 7, there are provided: a connecting cavity 95 connecting the first groove 91 and the third groove 93 on the same side with respect to the separator body; and a connecting cavity 96 connecting the second groove 92 and the fourth groove 94 on the same side with respect to the separator body.

In these metallic molds, there are also provided: backup cavities 97 and 98, located toward the center of the separator from the first and second grooves 91 and 92, to accommodate excess melted seal material and to allow the forming of flash portions 103 and 104; and backup cavities 99 and 100, located toward the peripheral edge of the separator from the third and fourth grooves 93 and 94, to accommodate excess melted seal material and to allow the forming of flash portions 105 and 106.

In this configuration of the molds, when the melted seal material is injected into the sprues 83a and 83b of an upper mold 110 and a lower mold 111, the melted seal material is injected into the first to sixth grooves 91–94 from the runners 84a and 84b through the gates 85a and 85b; then, a portion of the melted seal material injected into the grooves 91–94 is further supplied into the connecting cavities 95 and 96 and backup cavities 97–100, each of which is formed in either the front side or the back side of the separator body.

As described above, the first groove 91 and the third groove 93, which are located on one side of the separator body, are connected by the connecting cavity 95, and the second groove 92 and the fourth groove 94, which are located on the other side of the separator body, are connected by the connecting cavity 96; thus, the tolerance required for the excessively supplied melted seal material may be moderated.

In addition, the first to fourth seals 41–44 more firmly adhere to the separator body by means of seal bridges 101 and 102; therefore, separation of the first to fourth seals 41–44 from the separator body, which could occur when the seal-integrated separator is removed from the molds, can be preferably prevented.

Furthermore, a short circuit between the cathode side separator 14 and the anode side separator 16, which are positioned adjacent to each other in an assembled fuel cell stack, or a short circuit due to condensation of water, can be preferably prevented since the seal bridges 101 and 102 also function as an insulation layer.

Figure 8:
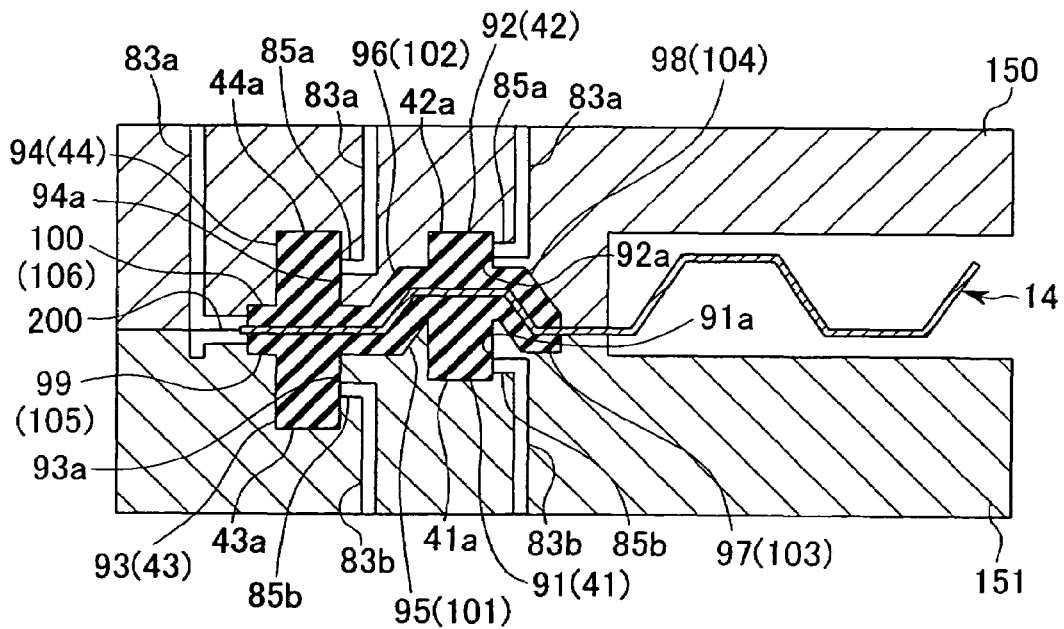
FIG. 8 is a partial cross-section of an alternative configuration based on the third configuration of the metallic mold used in the first embodiment of the present invention.

Referring now to FIG. 8 and primarily comparing the difference from FIG. 7, an alternative configuration based on the third configuration of the injection mold used for fabricating the cathode side separator 14 will be explained.

In FIG. 8, the same reference symbols are used for the same elements as in FIGS. 6 and 7.

In the configuration of the metallic molds shown in FIG. 8, the melted seal material is supplied from the sprue 83a (leftmost sprue) in an upper mold 150 into the first and third grooves 91 and 93 in a lower mold 151, and into the second and fourth grooves 92 and 94 in the upper mold 150, via the mold mating surface 200 between the upper mold 150 and the lower mold 151. The gates 85b are connected to the first and third grooves 91 and 93 in the lower mold 151 at their side portions 91a and 93a, i.e., at the portions not forming sealing surfaces, and the gates 85a are connected to the second and fourth grooves 92 and 94 in the upper mold 150 at their side portions 92a and 94a, i.e., at the portions not forming sealing surfaces. The gates 85a are connected to the sprues 83a in the upper mold 150, and the gates 85b are connected to the sprues 83b in the lower mold 151.

In this configuration of the molds, since the melted seal material is supplied from the sprue 83a (leftmost sprue) in the upper mold 150 into the first and third grooves 91 and 93 in the lower mold 151, and into the second and fourth grooves 92 and 94 in the upper mold 150, via the mold mating surface 200 between the upper mold 150 and the lower mold 151, supply marks which are undesirable for the sealing performance are not formed on side portions, i.e., sealing surfaces, 41a, 43a, 42a, and 44a of the first seal 41, the third seal 43, the second seal 42, and the forth seal 44, each of which is formed corresponding to the grooves 91, 93, 92, and 94; therefore, product quality may be improved. In other words, burrs formed during injection molding are located at positions where the burrs do not degrade the sealing performance, i.e., located on the side portions 91a, 92a, 93a, and 94a. The formability of the seals may be improved when the melted seal material is supplied to the sprues 83a and 83b corresponding to the grooves 91, 93, 92, and 94 in addition to the melted seal material supplied via the mold mating surface. Since the supply mark formed at the mold mating surface 200 will not degrade the sealing performance, product quality may be improved.

Figure 9:
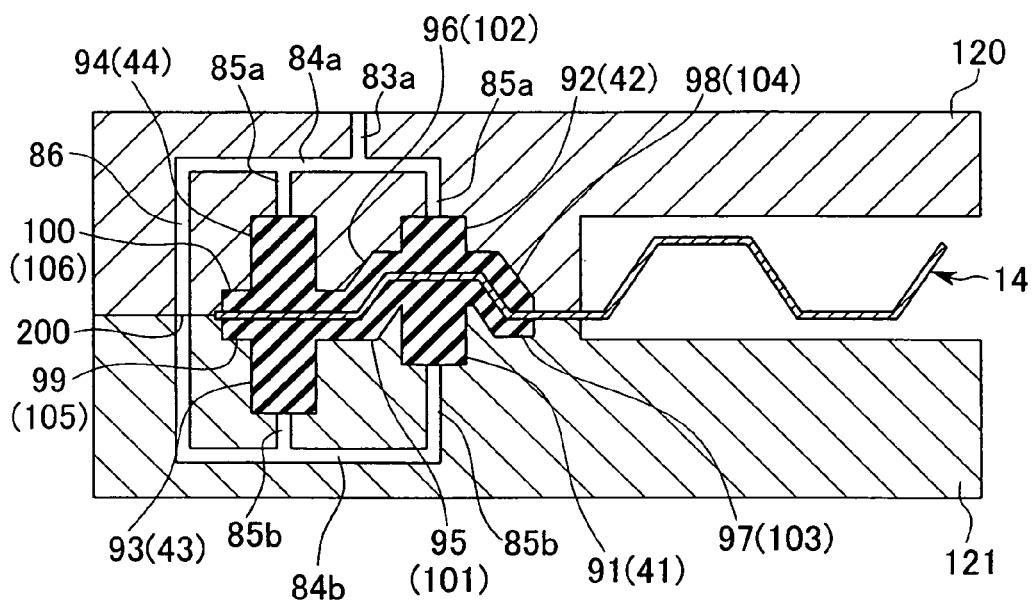
FIG. 9 is a partial cross-section of a fourth configuration of the metallic mold used in the first embodiment of the present invention.

Referring now to FIG. 9 and primarily comparing the difference from FIG. 7, a fourth configuration of the injection mold used for fabricating the cathode side separator 14 will be explained.

In FIG. 9, the same reference symbols are used for the same elements as in FIGS. 6 and 7.

In the metallic mold shown in FIG. 9, the bypass portion 86, which connects the runner 84a in an upper mold 120 and the runner 84b in a lower mold 121, is provided, instead of providing the sprue 83b.

In this configuration, the melted seal material is supplied to the sprue 83a in the upper mold 120; a portion of the melted seal material is injected into the second, fourth, and sixth grooves 92 and 94, the connecting cavity 96, and the backup cavity 98 and 100, through the runner 84a and the gates 85a in the upper mold 120; the rest of the melted seal material flows from the runner 84a in the upper mold 120 to the bypass portion 86, and is injected into the first, third, and fifth grooves 91 and 93, the connecting cavity 95, and the backup cavities 97 and 99, through the runner 84b and the gates 85b in the lower mold 121.

Therefore, when using the molds according to the fourth configuration, the advantageous effects obtainable by using the molds according to the second and third configurations can be simultaneously achieved.

Figure 10:
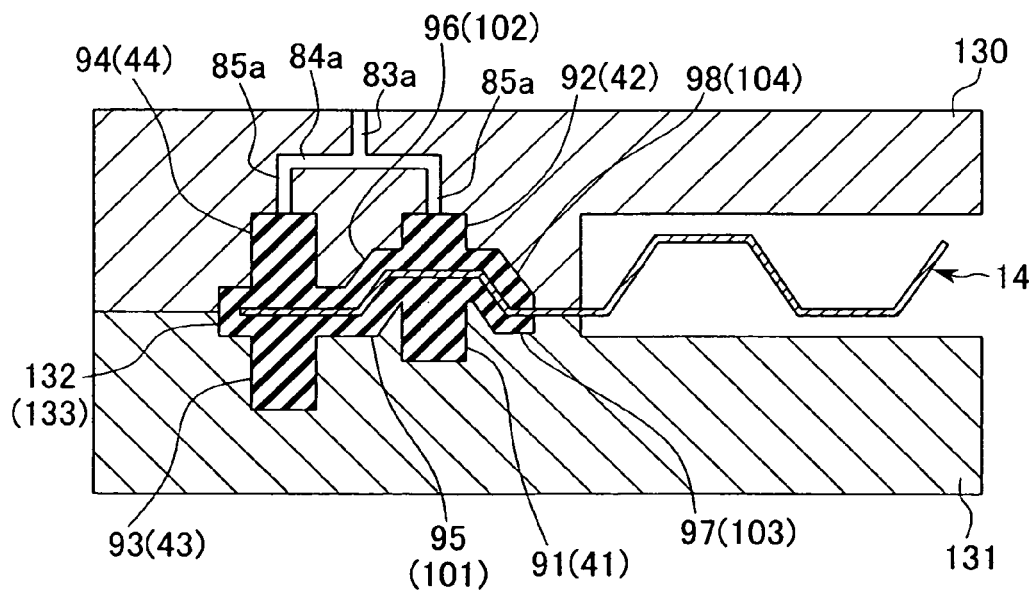
FIG. 10 is a partial cross-section of a fifth configuration of the metallic mold used in the first embodiment of the present invention.

Referring now to FIG. 10 and primarily comparing the difference from FIG. 7, a fifth configuration of the injection mold used for fabricating the cathode side separator 14 will be explained.

In FIG. 10, the same reference symbols are used for the same elements as in FIG. 7.

In the metallic mold shown in FIG. 10, a wraparound cavity 132, which connects the third groove 93 and the fourth groove 94 to each other by wrapping around the outer periphery of the separator body and which is to form a wraparound seal 133, is provided in a lower mold 131 instead of providing the sprue 83b, runner 84b, and gate 85b in the lower mold 131.

In this configuration, the melted seal material supplied to the sprue 83a in an upper mold 130 is injected into the second, fourth, and sixth grooves 92 and 94, through the runner 84a and the gates 85a in the upper mold 130; and then, a portion of the melted seal material injected into the grooves 92 and 94 is further supplied into the connecting cavity 96 and backup cavity 98, both of which are formed in the back side of the separator body, and into the wraparound cavity 132.

A portion of the melted seal material injected into the fourth groove 94 flows toward the front side of the separator body through the wraparound cavity 132 formed outside the outer periphery of the separator body, and is further supplied into the third groove 93, the connecting cavity 95, the first groove 91, and the backup cavity 97.

In other words, the melted seal material is supplied to the front side of the separator body through the wraparound cavity 132, instead of through the runner 84b in the first to fourth configuration.

In this configuration of the molds, in addition to the advantageous cost reduction in forming due to a single injection, the formability of the first to sixth seals 41–45 may be improved since the injection pressure may be reduced depending on the size of the connecting cavities 95 and 96, and the wraparound cavity 132.

Furthermore, the periphery of the cathode side separator 14 is electrically insulated.

Figure 11:
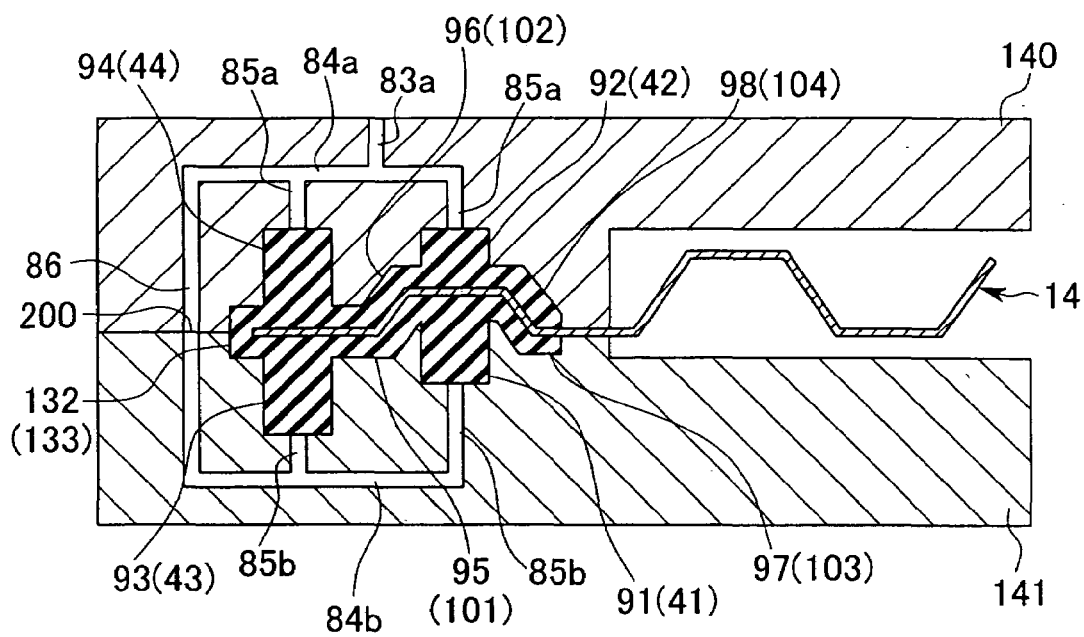
FIG. 11 is a partial cross-section of a sixth configuration of the metallic mold used in the first embodiment of the present invention.

Referring now to FIG. 11 and primarily comparing the difference from FIG. 10, a sixth configuration of the injection mold used for fabricating the cathode side separator 14 will be explained.

In FIG. 11, the same reference symbols are used for the same elements as in FIGS. 6 and 10.

In the metallic mold shown in FIG. 11, the runner 84b and the gates 85b are provided in a lower mold 141, and the bypass portion 86 connecting the runner 84a in an upper mold 140 and the runner 84b in the lower mold 141 is provided.

In this configuration, a portion of the melted seal material supplied to the sprue 83a in the upper mold 140 is injected into the second, fourth, and sixth-grooves 92 and 94, through the runner 84a and the gates 85a in the upper mold 140; another portion of the melted seal material flows from the runner 84a in the upper mold 140 to the bypass portion 86, and is injected into the first, third, and fifth grooves 91 and 93, through the runner 84b and the gates 85b in the lower mold 141.

Furthermore, a portion of the melted seal material injected into the second and fourth grooves 92 and 94 is supplied into the connecting cavity 96 and the backup cavity 94, both of which are formed in the back side of the separator body, as well as into the wraparound cavity 132; a portion of the melted seal material injected into the first and third grooves 91 and 93 is supplied into the connecting cavity 95 and the backup cavity 97, both of which are formed in the front side of the separator body, as well as into the wraparound cavity 132.

In this configuration of the molds, in addition to the advantageous effect obtainable by using the molds according to the fifth configuration, it is possible to accurately form the wraparound seal, the seal bridges 101 and 102, and the flash portions 103 and 104.

The present invention is not limited to the foregoing embodiments and alternative embodiments are also possible; the physical values described above are merely examples which should not restrict the present invention.

For example, the foregoing methods for fabricating seal-integrated separators having a dual seal structure in which the third and fourth seals 43 and 44 are provided in addition to the first and second seals 41 and 42 are also applicable in fabricating seal-integrated separators having a single seal structure, as a second embodiment shown in FIGS. 12 to 16.

Figure 12:
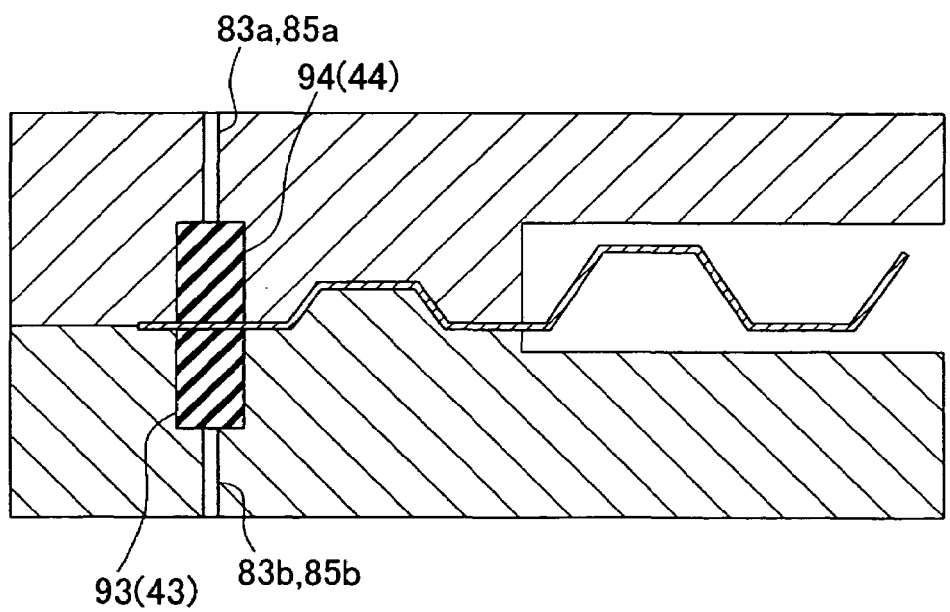
FIG. 12, corresponding to FIG. 5 showing the first embodiment, is a partial cross-section of a first configuration of a metallic mold used in a second embodiment of the present invention.
Figure 13:
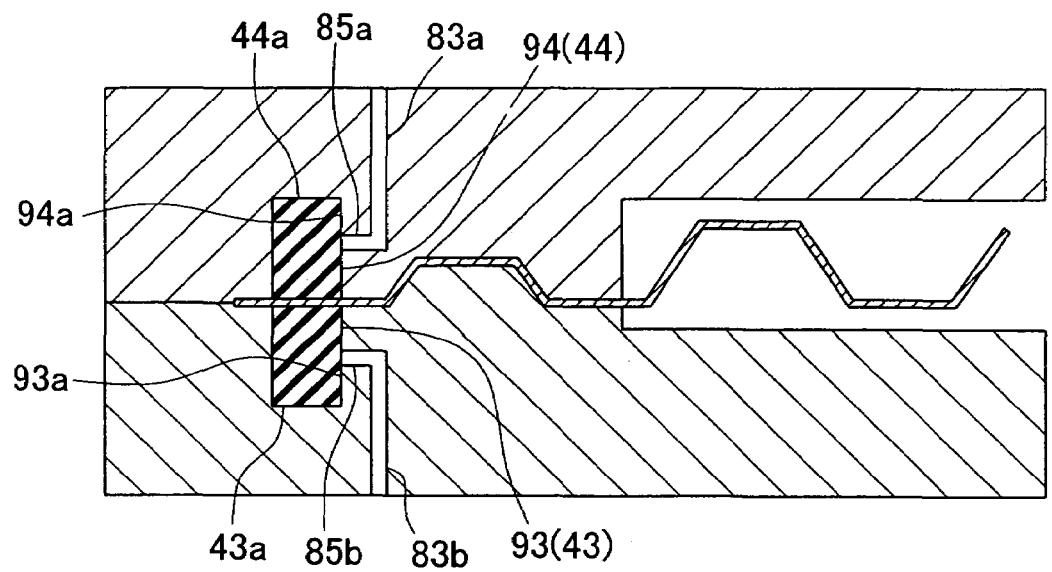
FIG. 13, corresponding to FIG. 8 showing the first embodiment, is a partial cross-section of an alternative configuration based on the first configuration of the metallic mold used in the second embodiment of the present invention.
Figure 14:
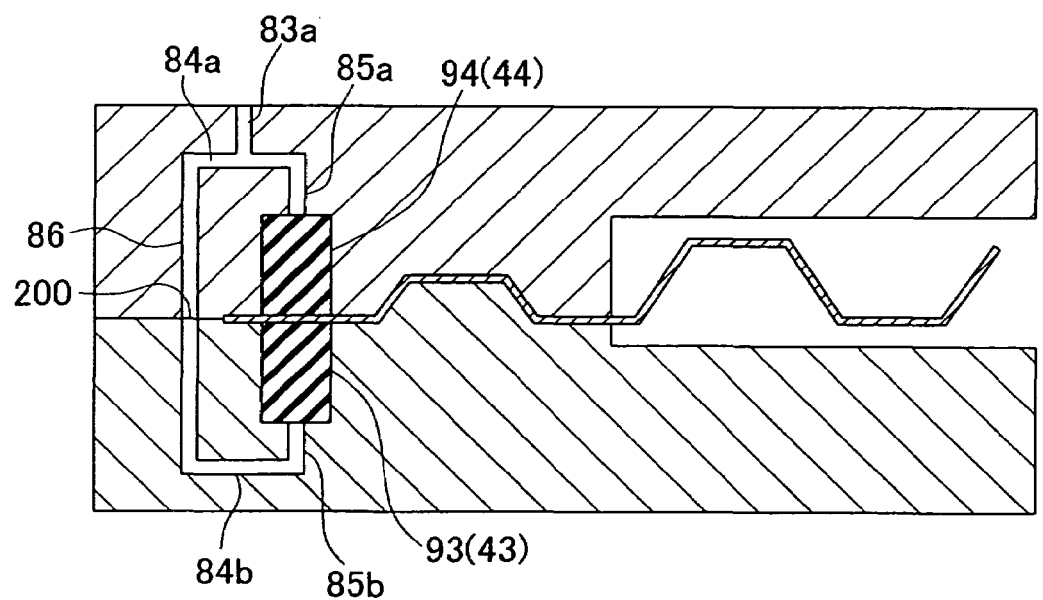
FIG. 14, corresponding to FIG. 6 showing the first embodiment, is a partial cross-section of a second configuration of the metallic mold used in the second embodiment of the present invention.
Figure 15:
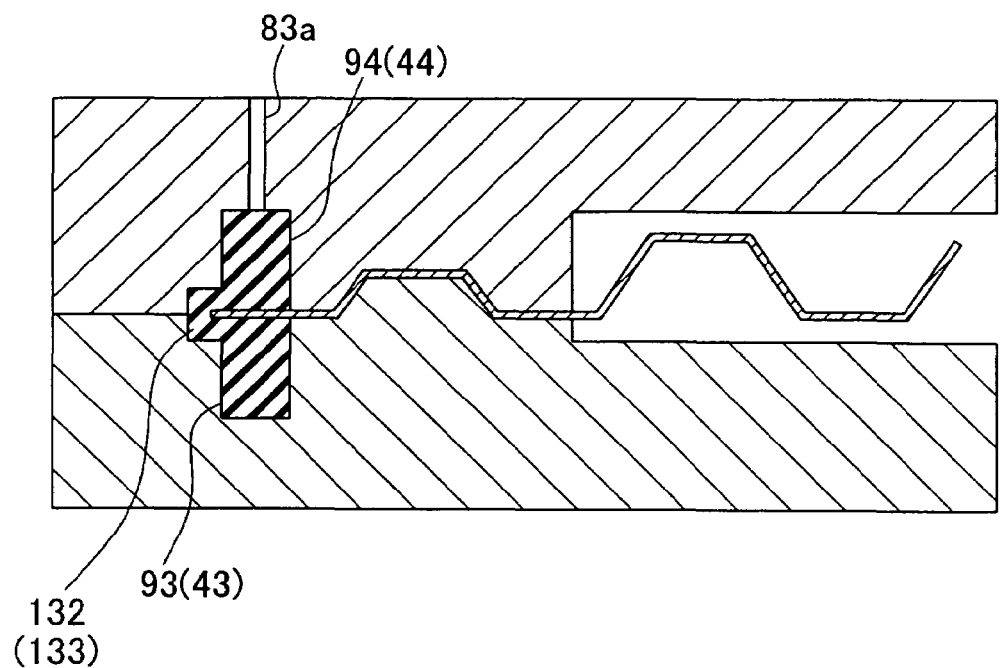
FIG. 15, corresponding to FIG. 10 showing the first embodiment, is a partial cross-section of a third configuration of the metallic mold used in the second embodiment of the present invention.
Figure 16:
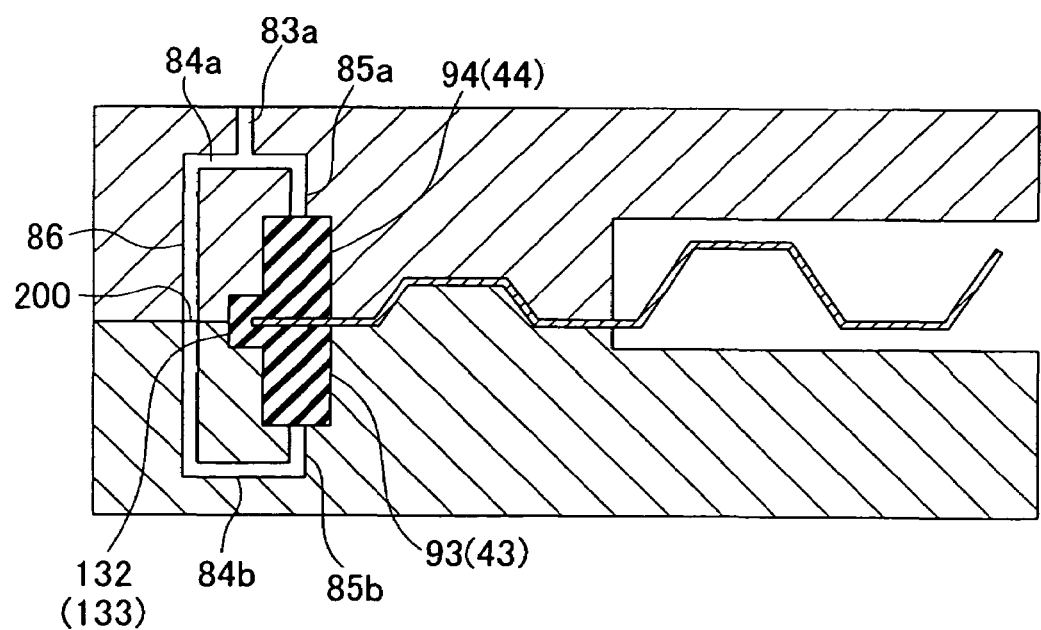
FIG. 16, corresponding to FIG. 11 showing the first embodiment, is a partial cross-section of a fourth configuration of the metallic mold used in the second embodiment of the present invention.
Figure 17:
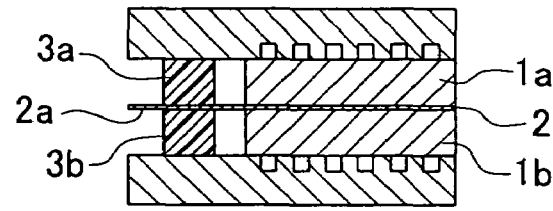
FIG. 17 is a partial cross-section showing the major portion of a fuel cell in the prior art, in which seals are symmetrically disposed so as to sandwich a solid polymer electrolyte membrane.
Figure 18:
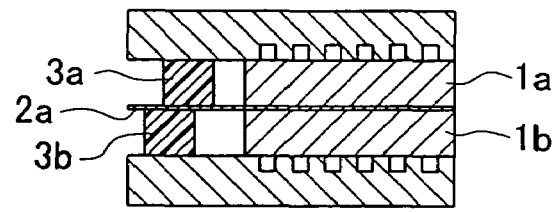
FIG. 18 is a partial cross-section showing the major portion of a fuel cell in the prior art, in which seals are disposed with a slight lateral offset with respect to each other and sandwich the solid polymer electrolyte membrane.
Figure 19:
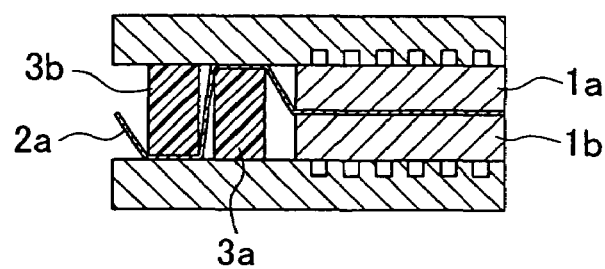
FIG. 19 is a partial cross-section showing the major portion of a fuel cell in the prior art, in which an outer seal and an inner seal are disposed side by side so as to hold a portion of the solid polymer electrolyte membrane therebetween.
Figure 20:
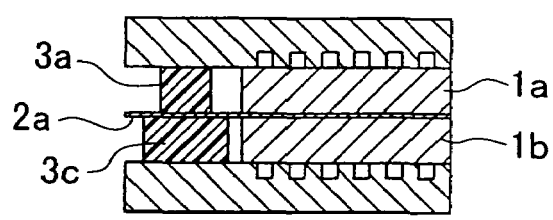
FIG. 20 is a partial cross-section showing the major portion of a fuel cell in the prior art, in which one seal is made wider than the other seal and they are disposed so as to sandwich the solid polymer electrolyte membrane.

FIG. 12, corresponding to FIG. 5 showing the first embodiment, is a partial cross-section of a first configuration of the metallic mold used in the second embodiment of the present invention; FIG. 13, corresponding to FIG. 8 showing the first embodiment, is a partial cross-section of an alternative configuration based on the first configuration of the metallic mold used in the second embodiment; FIG. 14, corresponding to FIG. 6 showing the first embodiment, is a partial cross-section of a second configuration of the metallic mold used in the second embodiment; FIG. 15, corresponding to FIG. 10 showing the first embodiment, is a partial cross-section of a third configuration of the metallic mold used in the second embodiment; FIG. 16, corresponding to FIG. 11 showing the first embodiment, is a partial cross-section of a fourth configuration of the metallic mold used in the second embodiment of the present invention.

In FIGS. 12 to 16, the same reference symbols are used for the same elements as in FIGS. 5 to 10. In FIG. 12, since the sprues 83a and 83b also function as the gates 85a and 85b, both reference symbols are appended.

In the foregoing embodiments, the separator bodies are made of stainless steel; however, these may also be made of other metals or carbon-containing materials.

For the seal material, an elastomeric material, e.g., a hot-curing type rubber, hot cure type liquid seal material, etc., which requires hot curing or hot setting, or a thermoplastic elastomer or cold setting type liquid seal material, which does not require heating, may be used.

It is obvious from the foregoing description that the present invention will provide the following advantageous effects.

(1) According to the first aspect of the present invention, since the seals are simultaneously integrated on both sides of the separator body, the seal-integrated separator can be fabricated through a single process, the seals can be accurately positioned, and the assembling time of the fuel cell units is greatly reduced, in contrast to the cases in which seals which are not integrated on the separator are positioned relative to both sides of the separator body or a paste of the seal material is coated onto the separator; thus, fuel cell units with a superior sealing performance can be fabricated at low cost.

(2) According to the second aspect of the present invention, in addition to the advantageous effects obtainable through the first aspect, only a single injection is required to simultaneously form the seals on both sides of the separator body; therefore, a relatively low production cost can be achieved.

(3) According to the third aspect of the present invention, in addition to the advantageous effects obtainable through the second aspect, the injection pressure in the grooves in each of the molds may be reduced; thus, the formability of the seals can be improved.

(4) According to the fourth aspect of the present invention, in addition to the advantageous effects obtainable through the first aspect, the melted seal material is supplied into the groove through the gate which is formed at a portion not forming a sealing surface of the seal; therefore, a supply mark will not be made on the sealing surface, which means that improved product quality can be achieved.

(5) According to the fifth aspect of the present invention, the dual seal-integrated separator, in which the dual seals surrounding the electrode's reaction surface independently function with respect to each other and a fluid leak is preferably prevented around the electrode's reaction surface, can be easily fabricated through a single process; the dual seal-integrated separator can be easily fabricated, even though it is generally difficult to fabricate a separator with dual seals since the dual seals must be accurately positioned.

(6) According to the sixth aspect of the present invention, in addition to the advantageous effects obtainable through the fifth aspect, the number of gates may be reduced and the seal material can be supplied under the same conditions with respect to each of the molds; therefore, a relatively low production cost can be achieved.

(7) According to the seventh aspect of the present invention, in addition to the advantageous effects obtainable through the fifth aspect, each of the seals connected to each other by means of the seal bridge more firmly adheres to the separator body; therefore, separation of the seals from the separator body, which could occur when the seal-integrated separator is removed from the molds, can be preferably prevented; in addition, since a portion of the injected seal material is supplied into the connecting cavity for forming the seal bridge, the tolerance required for the excessively supplied melted seal material may be moderated; furthermore, a short circuit such as due to condensation of water can be preferably prevented since the seal bridge also functions as an insulation layer.

(8) According to the eighth aspect of the present invention, in addition to the advantageous effects obtainable through the fifth aspect, since a portion of the injected seal material is supplied into the backup cavity, the tolerance required for the excessively supplied melted seal material may be moderated.

(9) According to the ninth aspect of the present invention, in addition to the advantageous effects obtainable through the seventh aspect, only a single injection is required to simultaneously form the seals on both sides of the separator body; therefore, a relatively low production cost can be achieved.

(10) According to the tenth aspect of the present invention, in addition to the advantageous effects obtainable through the seventh aspect, the injection pressure in the grooves in each of the molds may be reduced; thus, the formability of the seals can be improved.

(11) According to the eleventh aspect of the present invention, in addition to the advantageous effects obtainable through the tenth aspect, only a single injection is required to simultaneously form the seals on both sides of the separator body; therefore, a relatively low production cost can be achieved.

(12) According to the twelfth aspect of the present invention, in addition to the advantageous effects obtainable through the seventh aspect, the melted seal material is supplied from the sprue formed in one mold into the grooves via mating surfaces of the molds; therefore, an undesired supply mark will not be made on the sealing surface, which means that improved product quality is achieved.

(13) According to the thirteenth aspect of the present invention, in addition to the advantageous effects obtainable through the twelfth aspect, the melted seal material is supplied into the grooves from the gates which are formed at a portion not forming a sealing surface of the seal, via the sprues in each of the molds and the gates; therefore, a supply mark will not be made on the sealing surface, which means that improved product quality is achieved; in addition, the formability of the seals may be improved by means of supplying the melted seal material not only via the mating surfaces of the molds, but also via the sprue corresponding to the grooves.

What is claimed is:

1. A method for fabricating a seal-integrated separator for a fuel cell, said seal-integrated separator including a separator body having a communication port, and seals which are integrated on both sides of said separator body and which are disposed around one of a reaction surface of an electrode during use and around said communication port, comprising the steps of:

providing an upper mold having a first groove positioned corresponding to said seal disposed on one side of said separator body and having at least one gate, and a lower mold having a second groove positioned corresponding to said seal disposed on the other side of said separator body and having at least one gate, the first groove being separate from the second groove;

holding said separator body between said upper mold and said lower mold; and injecting melted seal material to form said seals into each of said grooves in said upper mold and said lower mold through said gates respectively formed in said upper and lower molds, wherein said gate formed in one of said upper and lower molds communicates with said gate formed in the other of said molds via mating surfaces of said molds by a runner branching from said gate formed in the other of said molds.

2. A method according to claim 1, wherein said step of injecting melted seal material further comprises:

injecting said melted seal material into each of said grooves in said molds through a wraparound cavity formed between the periphery of said separator body and both of said upper and lower molds.

3. A method according to claim 1, wherein said gate is connected to a portion of said groove, said portion not forming a sealing surface of said seal.

4. A method for fabricating a seal-integrated separator for a fuel cell, said seal-integrated separator including a separator body, and dual seals which are integrated on both sides of said separator body and which are disposed, side by side, around an electrode's reaction surface during use, comprising the steps of:

providing an upper mold having a first set of grooves positioned corresponding to said dual seals disposed on one side of said separator body and having at least one gate, and a lower mold having a second set of grooves positioned corresponding to said dual seals disposed on the other side of said separator body and having at least one gate, the first set of grooves being separate from the second set of grooves;

holding said separator body between said upper mold and said lower mold; and injecting melted seal material to form said seals into each of said grooves in said upper mold and said lower mold through said gates respectively formed in said upper and lower molds, wherein said gate formed in one of said upper and lower molds communicates with said gate formed in the other of said molds via mating surfaces of said molds by a runner branching from said gate formed in the other of said molds.

5. A method according to claim 4, wherein both of said upper and lower molds have a connecting cavity for forming a seal bridge connecting said dual seals to each other.

6. A method according to claim 4, wherein said grooves have a backup cavity for accommodating an excessively injected amount of said seal material.

7. A method according to claim 5, wherein said step of injecting melted seal material further comprises:

injecting said melted seal material into each of said grooves in said molds through a wraparound cavity formed between the periphery of said separator body and both of said upper and lower molds.

8. A method according to claim 4, wherein both of said upper and lower molds have a connecting cavity for forming a seal bridge connecting said dual seals to each other, and wherein a sprue is formed, which communicates with said grooves in each of said upper and lower mold from one of said molds via mating surfaces of said molds.

9. A method according to claim 8, wherein another sprue is formed in the other of said molds, and wherein gates communicating with said sprues in said molds are formed and connected to portions of said grooves, said portions not forming a sealing surface of said dual seals.

* * * * *